(12) United States Patent
Tarutani et al.

(10) Patent No.: US 7,776,486 B2
(45) Date of Patent: Aug. 17, 2010

(54) TITANIUM-BASED MATERIAL FOR FUEL CELL SEPARATORS AND A METHOD FOR THE PRODUCTION THEREOF

(75) Inventors: Yoshio Tarutani, Hyogo (JP); Akira Seki, Ashiya (JP); Takashi Maeda, Ashiya (JP); Wataru Takahashi, Nishinomiya (JP); Takashi Doi, Rittou (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 459 days.

(21) Appl. No.: 11/710,555

(22) Filed: Feb. 26, 2007

(65) Prior Publication Data
US 2007/0259221 A1    Nov. 8, 2007

Related U.S. Application Data (63) Continuation of application No. PCT/JP2004/012761, filed on Aug. 27, 2004.

(51) Int. Cl.
*H01M 8/10* (2006.01)
*H01M 2/16* (2006.01)
(52) U.S. Cl. .................. 429/491; 429/247; 429/251
(58) Field of Classification Search .............. 429/247, 429/251, 30, 33
See application file for complete search history.

(56) References Cited

U.S. PATENT DOCUMENTS

| 5,955,207 | A | 9/1999 | Lederich et al. |
| 6,117,204 | A | 9/2000 | Saito et al. |
| 6,291,094 | B1 * | 9/2001 | Yoshimura et al. ........... 429/34 |
| 6,699,593 | B2 * | 3/2004 | Kaneta et al. ............... 428/670 |
| 7,410,610 | B2 * | 8/2008 | Woodfield et al. ............ 419/34 |

FOREIGN PATENT DOCUMENTS

| JP | 5-5142 | 1/1993 |
| JP | 8-100229 | 4/1996 |
| JP | 11-162479 | 6/1999 |
| JP | 2001-357862 | 12/2001 |
| JP | 2002-025579 | 1/2002 |
| JP | 2004-273370 | 9/2004 |

* cited by examiner

*Primary Examiner*—Patrick Ryan
*Assistant Examiner*—Julian Mercado
(74) *Attorney, Agent, or Firm*—Clark & Brody (57) ABSTRACT

A separator material effective for decreasing the weight of fuel cells is provided which is lightweight, has good corrosion resistance, and exhibits a minimized increase in electrical contact resistance during use for a long period. Titanium or a titanium alloy is prepared by melting so as to contain not greater than 5 mass % B, thereby forming a titanium-based material in which fine TiB-type boride particles are precipitated and dispersed. The material is then etched in an aqueous acidic solution such that some of the TiB-type boride particles are exposed on the surface through the passive film formed thereon.

10 Claims, 1 Drawing Sheet

TITANIUM-BASED MATERIAL FOR FUEL CELL SEPARATORS AND A METHOD FOR THE PRODUCTION THEREOF

This application is a continuation of International Patent Application No. PCT/JP2004/012761, filed Aug. 27, 2004. This PCT application was not in English as published under PCT Article 21(2).

TECHNICAL FIELD

This invention relates to a titanium-based material and a method for the production thereof. More particularly, the invention relates to a titanium-based material which has a decreased electrical contact resistance and good corrosion resistance and which is suitable as a material for separators of fuel cells.

BACKGROUND ART

Fuel cells have recently attracted a great deal of attention, and several types of fuel cells have been developed. Among others, polymer electrolyte fuel cells are expected to be put into practical use as a power source for low-pollution electric vehicles.

Figure 1:
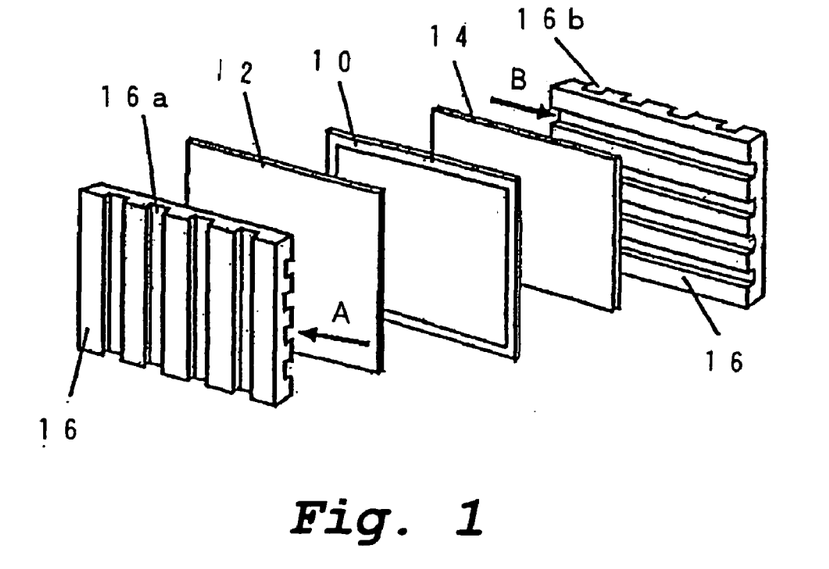
FIG. 1 is an exploded view showing the basic structure of a polymer electrolyte fuel cell.

FIG. 1 is an exploded view showing an example of the basic structure of a polymer electrolyte fuel cell. As illustrated therein, a single fuel cell of this type has a layered structure having a membrane of a polymer electrolyte 10, a membrane of a fuel electrode (anode) 12 disposed on one surface of the electrolyte membrane and a membrane of an oxidizer (air) electrode 14 disposed on the other surface thereof. A separator 16 is provided on each surface of the layered structure. Several tens to several hundreds of such single cells are stacked in a fuel cell for actual use. Although not shown, each surface of the polymer electrolyte membrane is coated with a catalyst comprising fine carbon particles and ultrafine noble metal particles.

A separator for a fuel cell which is also referred to as a bipolar plate serves to achieve electric connection between adjacent cells and provide means for feeding a fuel gas and an oxidizer gas, and it also functions as a plate for isolating these gases. To this end, as shown in the figure, a number of grooves or channels 16a and 16b are formed in a separator so as to constitute flow paths for gases being supplied and discharged.

The materials used for separators are roughly divided into non-metallic materials such as graphite and carbon and metallic materials. From the standpoint of costs and size reduction, there is a desire to change from non-metallic materials to metallic materials. Metallic materials which can conceivably meet the requirement for corrosion resistance include stainless steels, aluminum, nickel-iron alloys, titanium, and the like. Of these, stainless steels have been investigated most actively.

However, stainless steels have a very high contact resistance due to the presence of a passive film (passive state oxide film) on the surface. For example, a typical commercially available stainless steel sheet has a contact resistance as high as 100 mΩ·cm² or higher, which causes the electric connection between cells to be poor. Furthermore, the corrosion resistance of stainless steels is not sufficient in the environments encountered in fuel cells so that dissolution of metal takes place to form metal ions, which deteriorate the performance of the catalyst supported on an electrolyte membrane. In addition, the dissolved metal ions result in the formation of corrosion products such as Cr—OH and Fe—OH on the surface of a separator, thereby increasing the contact resistance of the separator. Therefore, with a separator made of stainless steel, a noble metal plated layer such as a gold plated layer is interposed between the separator 16 and each of the electrode membranes 12, 14 so as to extend over the contact portions therebetween and thus ensure the necessary electrical continuity and corrosion resistance. However, this technique requires very high costs, which limit the practical use of the cell.

A fuel cell is heavy, since it is a stack of a large number of single cells like that described above, so weight saving is strongly desired for fuel cells for use in vehicles such as automobiles. For this reason, a titanium-based material which can be lighter in weight and higher in corrosion resistance compared to stainless steel sheets has attracted attention as a material for separators of fuel cells.

The term "titanium-based material" used herein is intended to include both titanium metal and titanium alloys.

It is well known that a titanium-based material is lighter and has improved corrosion resistance compared to other metallic materials, but a passive film having a high electric resistivity exists on the surface thereof, as is the case with stainless steel. In general, a passive film is necessary for a metallic material to have corrosion resistance, and the thicker the passive film, the better the corrosion resistance. However, when the metallic material is used as a separator, the passive film results in an increased contact resistance. In the case of a titanium-based material, since plating can not readily be applied, plating with a noble metal cannot be employed as a means for decreasing the contact resistance.

It is proposed in JP 2001-357862-A1 that electrically conductive hard particles be embedded in the surface of a titanium-based material for fuel cell separators in such a manner that they are exposed on the surface of the material, thereby making it possible to utilize the particles as conducting paths and decrease the surface resistance. The conductive hard particles are formed from metal carbides of the $M_{23}C_6$, $M_4C$, or MC type (M: metal), and they are embedded in the surface of the titanium-based material by shot impinging. However, shot impinging required a complicated operation leading to an increase in costs. Moreover, the hard particles which are electrically conductive exist only in a surface region of the titanium-based material. Since the electrical conductivity of a titanium-based material is lower than that of stainless steel, the presence of the conductive particles only in the surface region cannot decrease the contact resistance adequately, thereby increasing the Joule heat generated with passage of electric current and hence the costs required for cooling.

DISCLOSURE OF INVENTION

The present invention provides a titanium-based material which is highly suitable as a conducting member by contact and particularly as a separator of a polymer electrolyte fuel cell and a method for its production. More particularly, the present invention provides a titanium-based material having a decreased contact (electrical) resistance compared to conventional titanium-based materials while maintaining good corrosion resistance.

A titanium-based material according to the present invention contains B (boron) in an amount of not greater than 5 mass %, and the boron is present in the form of precipitated TiB-type boride particles which are dispersed throughout the material, a part of the boride particles being exposed on a passive film formed on the surface of the material. As described later, the titanium-based material may contain additional elements other than Ti and B. Namely, the matrix phase in which the TiB-type boride particles are precipitated may be either titanium metal or a titanium alloy.

The titanium-based material according to the present invention can be produced by adding B or a source thereof in an amount of 5 mass % or less as B when melting a titanium-based material, thereby forming a titanium-based material in which B is present in the form of precipitated TiB-type boride particles dispersed throughout the material and then subjecting the titanium-based material to corrosion with an aqueous acidic solution so as to expose part of the TiB-type boride particles on the surface of the material.

As described earlier, a titanium-based material has a high contact resistance due to a passive film which unavoidably exists on the surface of the material. Therefore, it was difficult to maintain the contact resistance of a titanium-based material at a low level which is desired for a fuel cell separator. It is possible to make the passive film thinner by subjecting the titanium-based material to immersion in an acid or similar treatment to remove the passive film. However, owing to the high susceptibility of the titanium-based material to passivation, the passive film grows into a thick film again, and the contact resistance increases with time. Particularly in the environment of a fuel cell in which the potential varies, it is difficult to stably maintain a thin passive film.

The contact resistance of a material depends on the contact area per unit area of the material. Namely, the state of contact which seems to be surface contact over the entire surface is actually point contact, so the contact resistance depends on the number of contact points per unit area, the total area of the contact points, and the electrical resistivity of individual contact points.

When conductive particles penetrate the passive film of the material such that they are exposed on the surface of a titanium-based material, the conductive particles function as "paths for electricity" and make it possible to maintain the contact resistance of the material at a low level in a stable manner.

Possible titanium compounds which can be precipitated as conductive particles in a titanium-based material include TiC, TiB, and $TiB_2$. Of these, TiB is advantageous in terms of eased mass production and electrical conductivity. It has been found that TiB also has the advantage of good corrosion resistance.

In the case of a titanium-based material which contains an alloying metallic element (i.e., when a matrix phase from which particles are precipitated is a titanium alloy), the precipitated particles of TiB may have a composition in which part of Ti is replaced by the alloying metallic element (i.e., a composition of borides of Ti and other metal or metals). Therefore, in the present invention, the precipitated particles are referred to as TiB-type boride particles.

A titanium-based material according to the present invention has a matrix phase of titanium metal or a titanium alloy and TiB-type boride particles in which a part of the boride particles penetrate through the passive film covering the material such that they are exposed on the surface of the material. Since the TiB-type boride particles are of a metallic nature and have a high electrical conductivity, the exposure of the TiB-type boride particles decreases the contact resistance on the surface of the titanium-based material. In addition, these particles also have good corrosion resistance. In general, the corrosion resistance of a titanium-based material is ensured by the passive film formed on the surface. In the present invention, TiB-type boride particles penetrate the passive film, but the corrosion resistance of the titanium-based material is not impaired thereby. Therefore, the titanium-based material according to the present invention exhibits good corrosion resistance even in the environment of a fuel cell.

Thus, with a titanium-based material according to the present invention, it is possible to decrease the contact resistance and hence improve the electric conductivity on the surface without impairing the good corrosion resistance of titanium metal or a titanium alloy. Therefore, the titanium-based material is highly suitable for use as a conducting member by contact which is used in a corrosive environment, particularly as a separator of a solid electrolyte fuel cell, and more particularly as a separator of a polymer electrolyte fuel cell. In particular, it is suitable for use as a separator of a polymer electrolyte fuel cell which is used in vehicles such as automobiles since titanium-based materials are lighter than stainless steels by approximately 40%.

Compared to a separator made of graphite or carbon which is the mainline separator used in various fuel cells, a fuel cell separator according to the present invention is improved with respect to mass productivity and has the capability to reduce weight by reduction in thickness, so it has great potentials and applicability.

EMBODIMENTS OF INVENTION

The present invention will be described below more fully. All percents are mass percents unless otherwise indicated.

A titanium-based material according to the present invention has a structure comprising a matrix phase of titanium metal or a titanium alloy in which TiB-type borides particles are precipitated in a dispersed state.

(A) Chemical Composition of Matrix Phase (a) Titanium Metal

When the matrix phase is titanium metal, basically the titanium does not contain any alloying metal, but it is possible to adjust its strength level by changing the content of oxygen or inevitable impurity elements such as iron which are present in minute amounts. A titanium-based material according to the present invention can contain as inevitable impurity elements, in mass percent, at most 0.5% oxygen, at most 0.2% carbon, at most 0.5% iron, at most 0.1% hydrogen, at most 0.1% nitrogen, at most 0.3% aluminum, and other inevitable impurities, the remainder being substantially titanium.

There are two crystal forms of titanium, hexagonal $\alpha$-phase and cubic $\beta$-phase. At a temperature lower than 882° C., titanium metal has the crystal form of $\alpha$-phase. Titanium in the a phase is soft and has good cold workability. If the content of any of the inevitable impurity elements exceeds the above-described upper limit, the workability of titanium metal is so decreased by solid-solution hardening (strengthening) or formation of a compound that the titanium metal is no longer suitable for use as a material for a separator of a polymer electrolyte fuel cell. Particularly it is preferable that the Al content be as small as possible since Al deteriorates the corrosion resistance of titanium and thus causes an increase in contact resistance resulting from corrosion.

(b) Titanium Alloy

A titanium alloy is a material in which an alloying element or elements are added to titanium mainly for the purpose of improving in strength while minimizing damage to the light weight and corrosion resistance which are basic advantageous properties of titanium metal. The alloying elements which can be alloyed with titanium are divided into those which stabilize the α-phase and those which stabilize the β-phase.

The alloying elements which stabilize the β-phase include V, Mo, Cr, Fe, Nb, Ni, W, Cu, and the like, and their β-stabilizing abilities vary depending on the particular element. In order to evaluate the degree of β-stabilizing ability when a plurality of alloying elements are added, an index called V equivalent is defined based on the β-stabilizing ability of V. The V equivalent is expressed by the following equation:

$$V \text{ equivalent} = V + (15/10)Mo + (15/36)Nb + (15/25)W + (15/6.3)Cr + (15/4.0)Fe + (15/9)Ni + (15/13)Cu \qquad (1)$$

where each element indicates its content in mass percent.

As the value of V equivalent increases, the strength of the alloy also increases due to a solid-solution strengthening effect of the alloying elements. The strength can be increased by quenching from a high temperature in the β-phase region and subsequent aging treatment at a temperature in the α+β region. However, if the value of V equivalent exceeds 30, undesirable effects appear in that (1) the specific gravity of the alloy increases whereby the light weight of titanium is impaired, (2) the resistance to deformation increases due to the solid-solution hardening effect of the β-phase whereby the workability worsens, and (3) the increase in strength achievable by aging treatment becomes small. Therefore, the value of V equivalent is preferably not greater than 30%.

On the other hand, a typical alloying element which stabilizes the α-phase is Al, and elements having a weak β-stabilizing effect include Sn and Zr. Oxygen is also an element having a strong α-stabilizing effect. Similar to V equivalent, an index called Al equivalent is defined based on the α-stabilizing ability of Al, which is expressed by the following equation:

$$\text{Al equivalent} = Al + (1/3)Sn + (1/6)Zr + (10)O(\text{oxygen}) \qquad (2)$$

where each element indicates its content in mass percent.

As the value of Al equivalent increases, the strength of the alloy also increases due to a solid-solution strengthening effect of the alloying elements while the cold workability decreases. A value of Al equivalent exceeding 8% causes the formation of $\alpha_2$ phase ($Ti_3Al$), thereby increasing the tendency of the alloy toward embrittlement. Therefore, the value of Al equivalent is preferably not greater than 8%.

One or more α-stabilizing or β-stabilizing elements can be added, or both an α-stabilizing element and a β-stabilizing element can be added.

In another embodiment, the titanium alloy is an alloy containing Pd. A Pd-containing titanium alloy may contain other alloying element or elements, in addition to Pd, in such amounts that the value of V equivalent and/or that of Al equivalent is within the above-described ranges.

When a titanium-based material contains Pd, the surface of the material has a still lower contact resistance. In addition, the corrosion resistance of the material is improved, so the low contact resistance can be well maintained in the environment of use. The content of Pd is preferably in the range of 0.001%-0.5%. A lower content may not provide the desired effects sufficiently, while a higher content adds to the costs significantly.

(B) TiB-Type Borides Particles

A titanium-based material according to the present invention contains TiB-type boride particles which are precipitated and dispersed throughout the material. The TiB-type boride particles are of a metallic nature and hence are electrically conductive, and they also have good corrosion resistance.

As described previously, the composition of the TiB-type boride particles may be TiB itself or TiB containing other metallic element or elements which replace part of Ti. In fact, TiB-type precipitates in which part of Ti is replaced by Al have been confirmed.

When a titanium-based material, namely, titanium metal or a titanium alloy, is prepared by melting, the TiB-type boride particles can be formed by adding an appropriate amount of a source of B to the melt, thereby causing the boride particles to precipitate as inclusions which are dispersed throughout the titanium-based material.

An example of the most preferable sources of B is aluminum boride ($AlB_{12}$). Metallic boron is also preferred.

In order to stabilize the composition, once the source of B added to the melt is uniformly dissolved in the melt, it is preferably precipitated in the form of TiB-type boride particles in the course of solidification of the melt. Although it is conceivable to use TiB as a source of B, TiB is not readily available on the market for use as a material to be dissolved.

It is possible to control the composition, precipitation temperature, and precipitation behavior of the TiB-type boride particles which are precipitated in the course of solidification by adjusting the amount of B in the melt. When the titanium-based material contains B in an amount equal to or larger than that in the eutectic composition, the TiB-type boride particles precipitate as primary crystal grains in the melt (liquid phase), and their precipitation finishes in the vicinity of the eutectic temperature. On the other hand, when the amount of B contained in the titanium-based material is smaller than that in the eutectic composition, the matrix phase precipitates initially, and the TiB-type boride particles then precipitate at once in the vicinity of the eutectic temperature. In the case where TiB preferentially precipitates in the liquid phase, since the density of TiB is slightly higher than that of the melt, it is found that the precipitates settle within the melt so that they segregate macroscopically. In fact, however, probably due to agitation of the melt caused by thermal convection and flow by a concentration gradient in the melt, no significant sedimentation or marked macroscopic segregation occurs.

TiB-type inclusions precipitated in the vicinity of the eutectic temperature are characterized in that they are smaller in size and are dispersed more finely than those precipitated in the melt. Since the limit of dissolution of B in Ti to form a solid solution is very low and is on the order of at most 0.1%, B which is added to the melt precipitates mostly in the form of a boride during solidification and in a temperature range immediately below the solidus temperature.

B has no effect on stabilization of either the α-phase of titanium or of the β-phase thereof. Therefore, regardless of the crystal form of titanium, addition of B ultimately results in the formation of titanium metal or a titanium alloy in which TiB-type boride particles are precipitated and dispersed.

If the amount of B which is added is increased, $TiB_2$-type borides such as $TiB_2$ are also precipitated. In the present invention, however, TiB-type borides are used. The reason why the metallic precipitated particles which are used are TiB rather than $TiB_2$ is that $TiB_2$ has a higher melting point, thereby significantly worsening productivity. It is possible to control the form of precipitates by adjusting the amount of B which is added, although the necessary amount slightly varies depending on the additional alloying elements which may coexist.

If a large amount of B is present in titanium metal or a titanium alloy, the amount of TiB-type boride particles dispersed therein increases so as to decrease the ductility and hence the productivity of the resulting material. In order to ensure that the material has the formability required for the manufacture of fuel cell separators, it is desirable that the amount of borides precipitated in the titanium-based material not be excessively large.

The temperatures at which borides precipitate are in the vicinity of the solidification temperature of titanium or a titanium alloy, although it varies depending on the B content. The precipitates have the behavior that once they precipitate, they scarcely redissolve in solid solution. As the B content of the material and hence the amount of precipitated borides therein increase, cracking which occurs during preparation and working of the material becomes significant, thereby adversely affecting mass productivity. However, as long as the B content is at most 5%, it is possible to produce a titanium-based material on a commercial scale, although doing so may be accompanied by difficulty in some cases. If the B content exceeds 5%, the material cannot provide formability at room temperature to the extent required for fabrication of a fuel cell separator. Therefore, the B content is made at most 5%. Although there is no specific lower limit on the B content, at least 0.4% B is usually sufficient to form TiB-type boride particles in a requisite amount. Preferably the B content is in the range of 1% to 3%.

When the B content is as low as several tens of parts per million, the precipitated borides tend to mostly segregate along the grain boundaries of the matrix. For the purpose of reducing the contact resistance, there is no significant difference whether the borides precipitate along the grain boundaries or within the grains. However, needless to say, it is preferred that the borides be uniformly dispersed in order to eliminate any problem concerning formability at room temperature and cracking.

(C) Size of TiB-Type Boride Particles

TiB-type boride particles precipitate at high temperatures of around 1500° C. during solidification of a melt of titanium metal or a titanium alloy. Precipitation of these particles by a eutectic reaction at high temperatures makes it possible to precipitate them such that they disperse with considerable uniformity. TiB-type boride particles which are of metallic nature are thermodynamically stable and have good electric conductivity, and their corrosion resistance in the environment of fuel cells is also good and is comparable to that of the titanium-based material serving as the matrix.

TiB-type boride particles which precipitate in the course of solidification have an acicular form, and the higher the cooling speed, the finer the particles. However, when the particles remain as precipitated, it is difficult to achieve very finely dispersed state of the particles which is desired in the present invention. TiB-type boride particles are hard, so unless they are very finely dispersed, they accelerate jig wear. In addition, if TiB-type boride particles are not finely dispersed, the deformability of the material worsens, thereby adversely affecting formability and toughness. Furthermore, the material is susceptible to cracking when the acicular particles are broken by the action of external force.

Thus, it is preferred that a titanium-based material to which B is added and which is prepared by the melting method be subjected to a suitable combination of hot forging, hot rolling, and cold rolling so that the precipitated particles in the material are crushed and are more finely divided and dispersed. Since TiB-type boride particles have little deformability, they are easily crushed and finely dispersed by application of plastic working such as hot forging, hot rolling, and cold rolling.

For example, hot working and hot forging can be used to crush TiB-type boride particles, which are responsible for a decreased deformability, such that they are finely dispersed, thereby improving the formability and toughness of the material. Cold working is also effective, but cold working may possibly produce minute cracks at which rupture originates, so cold working must be performed carefully.

During application of plastic working, TiB-type boride particles which have little work deformability undergo working in such a manner that they break in the working direction and disperse. The state of dispersion of the boride particles can be controlled by the forging or rolling conditions.

The degree of fineness of the precipitated particles is such that the average particle diameter taken along the major axis is at most 30 micrometers, preferably at most 20 micrometers, and more preferably at most 10 micrometers. Needless to say, it is desirable that the particles be as finely and uniformly dispersed as possible in order to achieve good press formability and punchability.

(D) Volume Fraction of TiB-Type Boride Particles

The volume occupied by TiB-type boride particles is determined as a function of the amount of B added to a titanium-based material. If the volume fraction of the TiB-type boride particles is greater than 30 vol %, the workability of the material worsens in both hot and cold conditions, so working becomes difficult. On the other hand, if their volume fraction is less than 2 vol %, it is difficult to maintain the contact resistance at a low level. Therefore, the volume fraction of the TiB-type boride particles is preferably in the range of 2-30 vol %. In this respect, when the B content of a titanium-based material is about 2%, the volume fraction of TiB-type boride particles in the material is approximately 10 vol %.

(E) Surface Exposure of TiB-Type Boride Particles

In a titanium-based material according to the present invention, some of the TiB-type boride particles which are precipitated and dispersed in titanium metal or a titanium alloy are exposed on the surface of the material. The TiB-type boride particles are of a metallic nature and have a high electric conductivity. Therefore, although a passive film is formed on the surface of the titanium-based material, the contact resistance of the material is kept low by the presence of the TiB-type boride particles which are exposed on the surface by penetrating the passive film. In addition, the TiB-type boride particles also have good corrosion resistance. Thus, in spite of the TiB-type boride particles exposed on the surface, no significant decrease in corrosion resistance is observed in the material. It is preferred that the TiB-type boride particles exposed on the surface be formed by precipitation from the matrix phase.

As described above, while a melt of a titanium-based material to which B is added is solidified, TiB-type boride particles are precipitated and dispersed throughout the material, but the TiB-type boride particles do not break through the passive film formed on the surface, so they are not exposed on the surface.

Therefore, after a titanium-based material in which TiB-type boride particles are precipitated and dispersed is prepared and the particles are finely divided by subjecting the material to rolling or forging, it is necessary for the material to be subjected to some treatment so that the TiB-type boride particles can be exposed on the surface of the material.

Although there is no limitation of the method therefor in the present invention, possible methods are described below. If a titanium-based material is not subjected to such treatment and TiB-type boride particles are merely precipitated and dispersed in titanium metal or a titanium alloy, the surface contact resistance is not stable and its value is high.

In order to allow metallic inclusions precipitated in titanium or a titanium alloy in a titanium-based material to break through a passive film formed on the surface of the material so that they are exposed on the surface, the following methods are conceivable: (a) etching of the titanium-based material to remove the material in a surface region; (b) mechanical methods including, for example, (b-1) rolling of the titanium-based material through rolls having surface irregularities formed by subjecting the roll surfaces to shot impinging or etching (so-called dull rolls) and (b-2) embedding of TiB-type boride particles in the surface of the titanium-based material by means of blasting, abrasion, grinding, or the like; (c) surface modification which is performed by vapor deposition or similar technique. Two or more of these methods may be combined. Among these, etching is quite effective in the mass production of a titanium-based material according to the present invention since it can be carried out inexpensively on a commercial scale and can uniformly treat a large surface area in a macroscopic sense.

(a) Etching Method

This is a method in which a titanium-based material is immersed in an aqueous acidic solution to dissolve out and remove the material in its extremely thin surface region while leaving TiB-type boride particles present therein. As a result, the TiB-type boride particles protrude from the surface, and even if a passive film is formed on the surface after the etching treatment, the particles can remain exposed on the surface.

The aqueous acidic solution used for the etching treatment is one which can selectively dissolve the matrix phase of the titanium-based material (i.e., titanium metal or alloy) without dissolving the TiB-type boride particles. Preferably it is capable of dissolving the matrix phase uniformly.

Examples of useful aqueous acidic solutions are aqueous nitric-hydrofluoric acid solution, an aqueous sulfuric acid-based solution, an aqueous hydrochloric acid-based solution, and the like which have conventionally been used to pickle titanium-based materials. If necessary, an organic or inorganic additive for alleviating the degradation of the acidic solution or for smoothening the etched surface may be added. A commercially available inhibitor may also be added in order to control the etching rate.

The concentration of the acidic solution can be varied depending on the particular acid used, the plasticity of the matrix phase, and the temperature of the etching treatment. The temperature of the etching treatment may be in the range of from room temperature to the boiling point of the solution, and the concentration and temperature can be set by observing the progress of etching. These conditions are preferably adjusted such that the average weight loss by etching is in the range of 5-60 g/m$^2$ with the surface roughness being 0.06-5 micrometers in terms of mean line average surface roughness Ra.

A suitable aqueous acidic solution is an aqueous nitric-hydrofluoric acid solution at a temperature of 30-90° C. having a hydrofluoric acid concentration of 1-10% and preferably 1-5%, and a nitric acid concentration of 5-20% and preferably 5-10%. If the acid concentrations are lower, the efficiency of etching is decreased, and if they are higher, the roughness of the etched surface is so increased as to significantly increase the contact resistance. The use of an aqueous nitric-hydrofluoric acid solution makes is possible to simultaneously achieve the exposure of TiB-type boride particles and improvement in corrosion resistance caused by strengthening the passive film on the surface of the matrix phase. An example of the nitric-hydrofluoric acid solution is 10% HNO$_3$-3% HF at 55° C. The nitric-hydrofluoric acid solution may contain other acid or acids mixed therein.

Etching can be efficiently carried out by immersing a titanium-based material in an aqueous acidic solution, and the etching efficiency can be further improved by stirring the acidic solution or allowing it to flow. Etching may be conducted under electrolytic conditions by applying a voltage. It is also possible to employ a method in which an aqueous acidic solution is applied to the surface of a titanium-based material by injection through nozzles, showering, or spraying.

Following etching, the material is preferably subjected to neutralizing treatment. If etching is merely followed by water rinsing, even when water rinsing is performed thoroughly, the acidic component may remain inside fine depressions on the material surface, inside the gaps between the metallic inclusion particles and the matrix phases, and on grain boundaries, and it may be concentrated as drying proceeds. The concentration and precipitation of the acidic component causes surface corrosion to accelerate, and the contact resistance of the surface increases with time. In order to prevent this phenomenon, it is effective to perform neutralizing treatment by immersion or spraying using an aqueous alkaline solution having a pH higher than 7. Spraying includes the cases where the alkaline solution is injected through nozzles or showered.

Preferably, the alkali which is used is water soluble, has good water washability after treatment, can be easily disposed of as waste, is readily available, and is inexpensive. A suitable alkaline solution is an aqueous sodium hydroxide solution having a concentration of 3-10%.

(b) Mechanical Method

A mechanical method includes rolling through dull rolls and mechanical embedding of TiB-type boride particles in the surface region of the material.

As a result of rolling through dull rolls to impart or increase irregularities of the material surface, some TiB-type boride particles are exposed on the surface. However, only a small portion of the particles which are present are exposed by this method, so the effect is not adequate and has poor reliability.

The other method in which TiB-type boride particles are embedded in the surface of the material by blasting, abrasion, grinding, or the like results in insufficient bonding of the particles to the material surface, so with this method, it is more difficult to achieve the desired effect in a stable manner compared to the above-described etching method. It is also more difficult to ensure the uniformity of the surface.

A method in which electrically conductive particles are embedded is disclosed in JP 2001-257862-A 1, but the particles used therein are hard particles of the metal carbide type. It does not disclose embedding TiB-type boride particles.

(c) Surface Modification Method

Surface modification is a method in which film formation such as vapor deposition or ion implantation is combined with heat treatment for precipitation. It is an auxiliary method in view of its relatively high costs.

However, the mechanical method and the surface modification method have a possibility of practical utility as a method capable of mass production as a result of technical innovation in the future.

Of course, application of two or more of the above-described methods may be possible.

(F) Contact Resistance

In a titanium-based material according to the present invention, some TiB-type boride particles which are precipitated and dispersed in the matrix phase of titanium metal or titanium alloy are exposed on the surface of the material while penetrating the passive film forming a surface layer. As a result, the TiB-type boride particles which are electrically conductive function as "a path of electricity", thereby making it possible to provide a low contact resistance which is desired for a fuel cell separator.

The contact resistance, as measured by the method described in the examples, is preferably at most 20 $m\Omega \cdot cm^2$ and more preferably at most 15 $m\Omega \cdot cm^2$ at an applied load of 10 $kg/cm^2$ even after corrosion in air. When measured by the same method, the contact resistance of titanium metal exceeds 100 $m\Omega \cdot cm^2$ after corrosion in air.

As illustrated in the examples, when the titanium-based material contains Pd, the contact resistance becomes lower than 7 $m\Omega \cdot cm^2$ and it becomes still lower if the surface of the material is coated with a metal serving as a good conductor such as gold. Except for the above case, the contact resistance is generally 7 $m\Omega \cdot cm^2$ or higher.

For two given materials contacting each other, the contact resistance therebetween depends on the contact area. Thus, the contact resistance with finely dispersed TiB-type boride particles is largely influenced by the size and number of contact points. In experiments, the contact resistance is decreased to some extent under an increased pressure loading. This is thought to be due to an increase in the contact area and number of contact points. In order to decrease the contact resistance, it is advantageous to crush the TiB-type boride particles into finely divided particles by rolling or other technique, thereby increasing the number of contact points.

(G) Surface Roughness

A titanium-based material according to the present invention has an increased surface roughness since acicular TiB-type boride particles are exposed on the surface. Therefore, the surface roughness can be used to roughly determine the degree of exposure of the TiB-type boride particles. As a result, the contact resistance varies depending on the surface roughness of the material.

If the surface roughness is less than 0.06 micrometers in mean line average surface roughness Ra, the surface is too smooth, and the exposure of the TiB-type boride particles is not adequate, so the number of contact points is small and the particles have little effect on improving in contact resistance. On the other hand, if the value of Ra is greater than 5 micrometers, the number of contact points per unit area is significantly decreased, and there is a tendency for the contact resistance to decrease. Therefore, the value of Ra is preferably in the range of 0.06-5 micrometers and more preferably in the range of 0.06-2.5 micrometers. When the above-described corrosion treatment is conducted, the degree of corrosion may be adjusted in such a way that the value of Ra is in the above-described range.

The term "mean line average surface roughness Ra" is an index indicating the degree of two-dimensional surface roughness as specified in JIS B 0601-19812.

(H) Surface Metal Coating

The surface of a titanium-based material according to the present invention may be coated with a metal. Thus, the surface of the material may be coated with a metal so as to cover the TiB-type boride particles which are exposed on the surface. An example of the metal is a noble metal such as gold. Coating can be carried out by electroless plating, displacement plating, or electrolytic plating, for example.

A titanium-based material according to the present invention has good corrosion resistance and a decreased contact resistance and is workable, so it is suitable for use as a material for a conducting member by contact such as a separator of fuel cells and particularly polymer electrolyte fuel cells. Due to its light weight, the material is particularly suitable as a separator for fuel cells which are used as power supplies for vehicles such as electric automobiles.

As shown in FIG. 1, a fuel cell separator has a number of grooves (channels) on both surfaces. Typically, the grooves on each surface extend at a right angle to those on the other surface. The grooves can be formed by any suitable method such as press forming, electric discharge machining, cutting, or a combination of these.

EXAMPLES

Example 1

Twenty-four titanium-based parent materials for working a-x having the compositions shown in Table 1 were prepared by either of the following melting methods. The raw materials used for melting were commercially available titanium sponge and a material of the individual alloying elements for melting (metals or master alloys) as required. B was added using a commercially available Al—B master alloy ($AlB_{12}$) or metallic boron.

In the table, "a" is an example in which the parent material is titanium metal which does not contain B, "s-t" are examples in which the parent materials are titanium alloys which do not contain B, "b-i, l and q" are examples in which the parent materials contain B in a matrix phase of titanium metal, and the others are examples in which the parent materials contain B in a matrix phase of a titanium alloy. In the case of a composition which contains B, an ingot of a parent material for working obtained by solidification of a melt had TiB-type boride particles which were precipitated and dispersed in a matrix phase.

Melting Method (1): Button Melting (Abbreviated as "butt")

A 200-gram rectangular button ingot (40 mm×80 mm×14 mm in thickness) was prepared in an arc melting furnace equipped with a nonconsumable is electrode.

Melting Method (2): Vacuum Melting (Abbreviated as "var")

A 15-kilogram cylindrical ingot (140 mm in diameter and 150 mm in height) was prepared in a vacuum are remelting furnace (VAR furnace) equipped with a consumable electrode.

From each button ingot, a cold rolled sheet was prepared by the following series of the steps:

ingot→hot rolling→annealing→cooling→descaling→pickling→cold rolling (→intermediate annealing→cold rolling)→ annealing→etching treatment→water rinsing→neutralizing treatment.

Each cylindrical ingot was forged in a press following heating for 2 hours at 1200° C. to form a billet having a thickness of 50 mm. The billet was then processed in the same manner as described above for a button ingot to form a cold rolled sheet.

Hot rolling of a button ingot or 50 mm-thick billet was carried out to give a final thickness of about 3.4 mm after heating to 1200° C. Hot rolling was conducted repeatedly with reheating in a temperature range of approximately from 1000° C. to 1200° C. before each rolling. Hot forging of a cylindrical ingot was also conducted repeatedly in the same manner. Annealing subsequent to hot rolling was carried out by heat treatment whereby the temperature was kept for 30 minutes at 700° C. in a vacuum followed by cooling. After annealing, descaling was performed by shot blasting, which was followed by pickling with a nitric-hydrofluoric solution. Cold rolling was carried out in every case with an initial thickness of 3.4 mm, which was reduced to a finish thickness of 0.3 mm. In the course of cold rolling, softening at 700° C. and subsequent pickling in an aqueous nitric-hydrofluoric acid solution (60° C.) containing 7% nitric acid and 3% hydrofluoric acid which was employed to simulate common conditions for mass production line were carried out as required. The resulting cold rolled sheet was subjected to final annealing under the same conditions as described above for annealing after hot rolling.

Subsequently, the cold rolled sheet of a titanium-based material obtained in this manner was subjected to etching (corrosion) treatment using one of the following aqueous acidic solutions (I)-(III):

(I) 10% nitric acid and 2% hydrofluoric acid in water;
(II) 5% nitric acid and 1% hydrofluoric acid in water:
(III) 5% nitric acid and 5% hydrofluoric acid in water.

After the etched titanium-based material was rinsed with water and dried, it was subjected to neutralizing treatment by immersing the material in an aqueous 6% sodium hydroxide solution at a temperature of 25° C. for 3 minutes while ultrasonic vibrations were applied, followed by ultrasonic rinsing for 15 minutes in distilled water, In some comparative runs, etching treatment and neutralizing treatment were not performed. The rinsed titanium-based material was finally dried by a cold air dryer.

Some of the titanium-based materials were subjected to electroless gold plating after etching treatment and neutralizing treatment, thereby coating the surface of the material with gold so as to cover the TiB-type boride particles exposed on the surface.

The titanium-based materials which were treated as above were measured for surface roughness (mean line average roughness Ra) as specified in JIS B 060-1982, initial contact resistance immediately after treatment, and contact resistance after they were left to stand in air for 500 hours.

The measurement of contact resistance was carried out by the four-terminal method using a test piece of a 0.3 mm-thick titanium-based material sheet and a commercially available 0.6 mm-thick glassy carbon sheet (manufactured by Showa Denko under the tradename SG3) with a contact area of 1 cm$^2$ and an applied load of 10 kg/cm$^2$. The surface of the test piece was washed with water and dried immediately before measurement and then subjected to the test. For test pieces which had not been subjected to etching treatment, measurement was performed after polishing with wet #600 emery paper.

The surface of each finished material was observed by SEM, and 50 TiB-type boride particles exposed on the surface were selected at random to measure their major axes. The major axis of the TiB-type boride particles was determined by calculating the average of the measured values. The surface roughness was measured using a commercially available surface roughness tester to determine the value of the mean line average roughness Ra of the surface. In addition, the volume fraction of the TiB-type boride particles on the surface was determined by transforming an optical photomicrograph of the surface into binary format and calculating the proportion of the area occupied by the particles.

The results of the above-described measurements are shown in Table 2 together with the symbol of the composition shown in Table 1, melting method, conditions for etching treatment (type of acidic solution and duration of treatment), and the thickness of gold plated coating.

TABLE 1

(mass %, remainder: Ti)

| Mark | V | Mo | Nb | W | Cr | Fe | Ni | Cu | Pd | Al | Sn | Zr | O | B | V eq. | Al eq. |
|---|---|---|---|---|---|---|---|---|---|---|---|---|---|---|---|---|
| a | — | — | — | — | — | 0.02 | — | — | — | — | — | — | 0.035 | — | 0.08 | 0.35 |
| b | — | — | — | — | — | 0.01 | — | — | — | — | — | — | 0.092 | 0.42 | 0.04 | 0.92 |
| c | — | — | — | — | — | 0.012 | — | — | — | — | — | — | 0.088 | 0.59 | 0.05 | 0.88 |
| d | — | — | — | — | — | 0.01 | — | — | — | 0.065 | — | — | 0.07 | 0.42 | 0.038 | 0.77 |
| e | — | — | — | — | — | 0.014 | — | — | — | 0.126 | — | — | 0.067 | 1.03 | 0.05 | 0.80 |
| f | — | — | — | — | — | 0.003 | — | — | — | — | — | — | 0.13 | 0.98 | 0.011 | 1.3 |
| g | — | — | — | — | — | 0.008 | — | — | — | 0.22 | — | — | 0.068 | 2.2 | 0.03 | 0.9 |
| h | — | — | — | — | — | 0.008 | — | — | — | — | — | — | 0.154 | 1.80 | 0.03 | 1.5 |
| i | — | — | — | — | — | 0.01 | — | — | — | — | — | — | 0.178 | 2.80 | 0.04 | 1.8 |
| j | 20.33 | — | — | — | — | 0.12 | — | — | — | 0.32 | 1.08 | — | 0.112 | 1.68 | 20.8 | 1.8 |
| k | 0.48 | 0.47 | — | — | — | 0.07 | — | — | — | 1.51 | — | — | 0.091 | 1.06 | 1.4 | 2.4 |
| l | — | — | — | — | — | 0.07 | — | — | — | 0.45 | — | — | 0.084 | 1.80 | 0.26 | 1.3 |
| m | — | — | 0.84 | 0.47 | — | 0.05 | — | — | — | — | — | — | 0.067 | 1.78 | 0.82 | 0.67 |
| n | — | — | — | — | 0.52 | 0.06 | 0.38 | — | — | — | — | — | 0.073 | 1.86 | 2.1 | 0.73 |
| o | — | — | — | — | — | 0.07 | — | 0.52 | — | — | — | — | 0.061 | 1.63 | 0.86 | 0.61 |
| p | — | — | — | — | — | 0.08 | — | — | — | — | — | 9.86 | 0.084 | 1.83 | 0.3 | 2.5 |
| q | — | — | — | — | — | 0.02 | — | — | — | — | — | — | 0.038 | 2.51 | 0.08 | 0.38 |
| r | 2.41 | — | — | — | — | 0.05 | — | — | — | 3.05 | — | — | 0.074 | 2.45 | 2.6 | 3.8 |
| s | 2.42 | — | — | — | — | 0.05 | — | — | — | 3.07 | — | — | 0.072 | — | 2.6 | 3.8 |
| t | 20.15 | — | — | — | — | 0.11 | — | — | — | 3.21 | 1.05 | — | 0.115 | — | 20.6 | 4.7 |
| u | — | — | — | — | — | 0.07 | — | — | 0.01 | — | — | — | 0.041 | 1.0 | 0.26 | 0.41 |
| v | — | — | — | — | — | 0.06 | — | — | 0.03 | — | — | — | 0.02 | 0.95 | 0.23 | 0.2 |
| w | 2.8 | — | — | — | — | 0.06 | — | — | 0.03 | 2.99 | — | — | 0.073 | 1.1 | 3.0 | 3.3 |
| x | — | — | — | — | — | 0.08 | — | — | 0.05 | — | — | — | 0.05 | 1.05 | 0.3 | 0.5 |

TABLE 2

| Run No. | Mark in Table 1 | Melting method | TiB-type Particles Major axis (μm) | TiB-type Particles Volume percent | Thickness of gold coating (nm) | Etching treatment Solution used | Etching treatment Period (min) | Surface roughness Ra (μm) | Contact resistance (mΩ·cm²) Initial | Contact resistance (mΩ·cm²) After 500 hr |
|---|---|---|---|---|---|---|---|---|---|---|
| 1 | a‡ | butt | — | 0 | — | II | 4 | 0.99 | 27.7 | 124.6 |
| 2 | b | butt | 8.5 | 2.0 | — | II | 4 | 1.1 | 12.4 | 11.7 |
| 3 | c | butt | 8.9 | 2.8 | — | II | 4 | 1.3 | 10.1 | 10.2 |
| 4 | d | butt | 7.2 | 2.0 | — | I | 4 | 2.2 | 12.3 | 13.0 |
| 5 | e | VAR | 10.6 | 4.8 | — | I | 2 | 1.8 | 8.6 | 9.5 |
| 6 | e | VAR | 10.6 | 4.8 | — | II | 2 | 0.95 | 8.1 | 8.9 |
| 7 | f | butt | 6.7 | 4.6 | — | II | 2 | 0.88 | 7.1 | 7.2 |
| 8 | f | butt | 6.8 | 4.6 | — | — | —* | 0.04 | 21.9 | 42.7 |
| 9 | f | butt | 7.1 | 4.6 | — | I | 8 | 6.9 | 9.4 | 12.0 |
| 10 | g | VAR | 9.0 | 9.9 | — | II | 2 | 1.1 | 7.7 | 14.0 |
| 11 | h | butt | 7.2 | 8.2 | — | I | 4 | 2.5 | 12.1 | 12.2 |
| 12 | i | butt | 7.4 | 12.4 | — | II | 4 | 1.4 | 8.5 | 9.9 |
| 13 | j | butt | 10.3 | 7.7 | — | III | 1 | 1.6 | 7.2 | 10.2 |
| 14 | k | butt | 8.8 | 4.9 | — | III | 1 | 1.3 | 11.3 | 19.0 |
| 15 | l | butt | 7.2 | 8.2 | — | II | 4 | 1.5 | 8.7 | 18.1 |
| 16 | m | butt | 8.0 | 8.1 | — | II | 4 | 1.5 | 7.8 | 12.4 |
| 17 | n | butt | 8.0 | 8.5 | — | II | 2 | 1.3 | 8.1 | 12.4 |
| 18 | o | butt | 7.7 | 7.5 | — | II | 2 | 1.1 | 7.7 | 10.6 |
| 19 | p | butt | 8.6 | 8.3 | — | II | 4 | 1.2 | 8.8 | 13.1 |
| 20 | q | butt | 7.7 | 11.2 | — | II | 4 | 1.3 | 8.0 | 11.9 |
| 21 | r | butt | 8.0 | 11.0 | — | — | —* | 0.05 | 22.3 | 27.4 |
| 22 | s‡ | butt | — | 0 | — | I | 4 | 1.3 | 30.5 | 108.9 |
| 23 | t‡ | butt | — | 0 | — | I | 4 | 1.6 | 41.7 | 144.9 |
| 24 | u | butt | 8.0 | 4.7 | — | II | 2 | 1.1 | 6.6 | 6.6 |
| 25 | v | butt | 8.0 | 4.4 | — | II | 2 | 1.1 | 6.5 | 6.7 |
| 26 | w | butt | 7.7 | 5.1 | — | II | 2 | 1.2 | 5.4 | 5.5 |
| 27 | x | butt | 8.6 | 4.9 | — | II | 2 | 1.3 | 5.1 | 5.2 |
| 28 | e | VAR | 10.6 | 4.8 | 50 | II | 2 | 1.2 | 3.3 | 3.4 |
| 29 | e | VAR | 10.6 | 4.8 | 100 | II | 2 | 1.3 | 3.1 | 3.1 |

[1] I = 10% HNO$_3$ + 2% HF;
II = 5% HNO$_3$ +1% HF;
III = 5% +HNO$_3$ + 5% HF
*Condition outside the range defined herein.

As shown in Table 2, in Run No. 8 in which a titanium-based material prepared by a melting method contained B so that TiB-type boride particles precipitated throughout the material but was not subjected to etching treatment, the TiB-type boride particles were not exposed on the surface, as can be evidenced by the very small surface roughness of the material (0.04 micrometers). As a result, the initial contact resistance was already high (21.5 mΩ·cm²), and it doubled after 500 hours in air. In contrast, in Run No. 7 in which a titanium-based material of the same composition was subjected to etching treatment, the material had a large surface roughness of 0.88 micrometers and a low contact resistance which was 7.1 mΩ·cm² at the initial value, and the low contact resistance varied little even after 500 hours in air.

Also in the case of materials having different compositions, when the material contained B and was subjected to etching treatment whereby TiB-type boride particles precipitated as inclusions were exposed on the surface of the material, it was possible to obtain titanium-based materials having a low initial contact resistance. The contact resistance after they were allowed to stand for 500 hours in air varied depending on their compositions, but it was at most 20 mΩ·².

As shown in Runs Nos. 24-27 (compositions u-x), when a titanium-based material contained Pd, the contact resistance was as low as less than 7 mΩ·cm² for both the initial value and the value after 500 hours. In Runs Nos. 28-29 in which the surface of a titanium-based material was coated with gold by plating, the contact resistance was a still lower value on the order of 3 mΩ·cm² for both the initial value and value after 500 hours.

Figure 2:
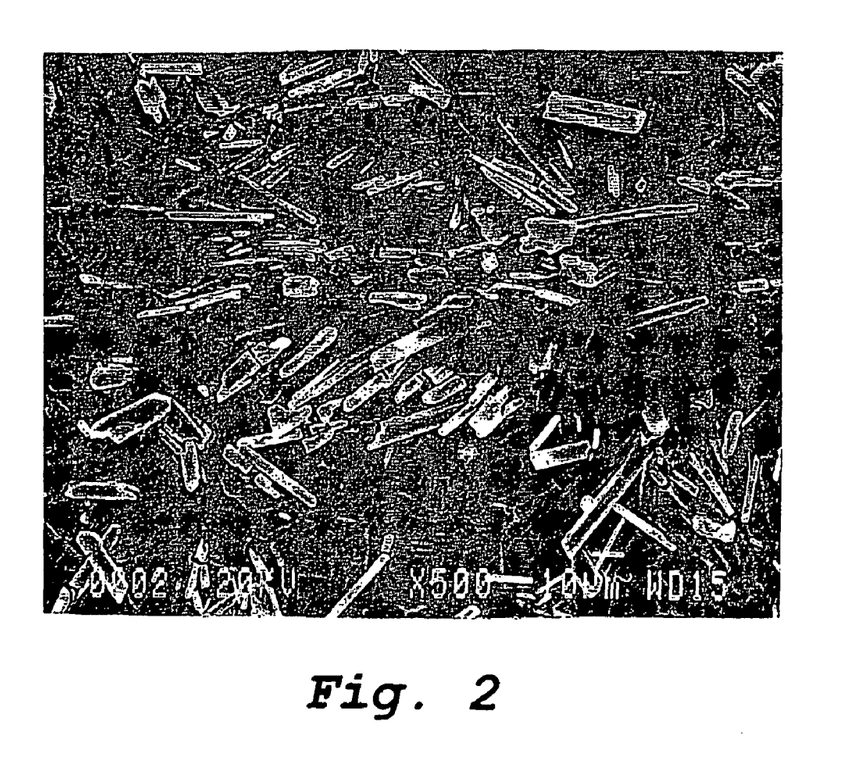
FIG. 2 is a surface SEM photograph of a titanium-based material prepared in an example.

FIG. 2 shows a SEM photograph of the surface of a test piece which corresponds to Run No. 7. The portions which look like white rods are TiB-type boride particles as dispersed phases. It can be seen that the TiB-type boride particles precipitated and dispersed in the material are exposed on the surface with their upper parts protruding from the surface.

Example 2

Separators were fabricated from hot rolled plates measuring about 3.4 mm thick and made of some titanium-based materials prepared by the VAR method in Example 1, and each of the separators was incorporated into a polymer electrolyte fuel cell to test its performance.

Each hot rolled plate which was used was prepared by hot rolling a billet and subjecting the resulting hot rolled plate to etching treatment and then neutralizing treatment in the same manner as described in Example 1, and a separator having a corrugated form was fabricated from the hot rolled plate. The separator had a shape as shown in FIG. 1 with gas passages in the form of channels having a width of 2 mm and a depth of 1 mm which were formed by mechanical machining (cutting) and electric discharge machining on both surfaces (anodic side and cathodic side), and it was incorporated in a single polymer electrolyte fuel cell.

The single polymer electrolyte fuel cell used for testing was a commercially available single fuel cell FC50 manufactured by Electrochem (U.S.A.) which was used after modification. Hydrogen gas of 99.999% purity was used as a fuel gas to be fed to the anodic side while air was used as an oxidizing gas to be fed to the cathodic side. The entire cell was warmed at 78° C., and the temperature inside the cell was controlled on the entrance side based on the measured value of moisture concentration in the exhaust gas on the exit side of the cell. The internal pressure of the cell was 1 atm. The pressures of the hydrogen gas and air to be fed to the cell were adjusted to be in the range of 0.04-0.20 bar. Evaluation of the performance of the cell started when a single cell voltage of 500±20 mA/cm$^2$-0.62±0.04 V could be confirmed.

A single cell measuring system based on a fuel cell measuring system of Series 890 manufactured by Scribner (U.S.A.) was used after modification. The evaluation was carried out under the same operating conditions in all the runs since the cell performance was expected to vary depending on the cell operating conditions.

While the fuel gas and air were passed through the single cell, the performance of the separator was evaluated by measuring the initial voltage (in volts) at the starting time of the performance evaluation and the voltage (in volts) after 1 hour therefrom and calculating the rate of voltage drop after 1 hour by the following equation:

Rate of voltage drop=1−(voltage after 1 hour/initial voltage).

The results are shown in Table 3.

percent, inevitable impurities having contents of at most 0.5% for oxygen, at most 0.2% for carbon, at most 0.5% for iron, at most 0.1% for hydrogen, at most 0.1% for nitrogen, and at most 0.3% for aluminum, and a remainder consisting essentially of titanium.

3. A titanium-based material as set forth in claim 1 which has a composition comprising, in addition to B, (1) one or more elements selected from V, Mo, Nb, W, Cr, Fe, Ni and Cu in such amounts that the value of V equivalent expressed by the following equation (1) is not greater than 30 mass %, and/or (2) one or more elements selected from Al, Sn, Zr, and oxygen in such an amount that the value of Al equivalent expressed by the following formula (2) is not greater than 8 mass %, and a remainder consisting essentially of inevitable impurities and titanium:

$$V\ equivalent = V+(15/10)Mo+(15/36)Nb+(15/25)W+(15/6.3)Cr+(15/4.0)Fe+(15/9)Ni+(15/13)Cu \quad (1)$$

$$Al\ equivalent = Al+(1/3)Sn+(1/6)Zr+(10)O(oxygen) \quad (2).$$

4. A titanium-based material as set forth in claim 1 which further contains 0.03-0.1 mass % Pd.

5. A titanium-based material as set forth claim 1 wherein the TiB-type boride particles are present in an amount of 2-30% by volume.

6. A titanium-based material as set forth in claim 1 wherein the TiB-type boride particles have a major axis measuring not greater than 30 micrometers.

TABLE 3

| Run No. | Composition | Preparation method Melting | Preparation method Rolling | Thickness of gold coating (μm) | Etching treatment Acidic solution[1] | Etching treatment Period (min) | Surface roughness (mean line average Ra) (μm) | Performance of fuel cell separator (n = 3) |
|---|---|---|---|---|---|---|---|---|
| 5 | e | VAR | Yes | — | I | 2 | 1.8 | <0.03 |
| 6 | e | VAR | Yes | — | II | 2 | 0.95 | <0.03 |
| 10 | g | VAR | Yes | — | II | 2 | 1.1 | <0.03 |
| 29 | e | VAR | Yes | 100 | II | 2 | 1.3 | <0.03 |

[1] I = 10% HNO$_3$ + 2% HF;
II = 5% HNO$_3$ + 1% HF.

As can be seen from Table 3, the rate of voltage drop was lower than 0.05 in all runs (n=3), and it was demonstrated that a titanium-based material according to the present invention had sufficient performance to be used as a separator for a fuel cell.

A titanium-based material according to the present invention has good corrosion resistance and a low contact resistance which can be maintained for a long period of time, so it is useful as a separator for a fuel cell such as a polymer electrolyte type.

The invention claimed is:

1. A titanium-based material for use as a fuel cell separator characterized by containing not greater than 5 mass % boron (B), the boron being present as TiB-type boride particles dispersed throughout the material and a part of the TiB boride particles being exposed on a passive film formed on the surface of the material to form paths for electricity.

2. A titanium-based material as set forth in claim 1 which has a composition comprising, in addition to B, in mass

7. A titanium-based material as set forth in claim 1 wherein the surface of the material including the exposed TiB-type boride particles is coated with an electrically conductive metal.

8. A fuel cell separator fabricated from a titanium-based material as set forth in claim 1.

9. A separator for a polymer electrolyte fuel cell, which is fabricated from a titanium-based material as set forth in claim 1.

10. A titanium-based material for use as a fuel cell separator, comprising a substrate comprised of a titanium-based material containing not greater than 5 mass % boron (B), and a passivated film formed on the surface of the substrate, the Ti-based material having TiB-particles dispersed throughout the substrate, a part of the TiB particles extending from the substrate through the passivation film to the surface of the passivation film to form an electrically conductive path.

* * * * *